United States Patent
Schumacher et al.

(10) Patent No.: US 6,532,023 B1
(45) Date of Patent: Mar. 11, 2003

(54) RECORDING SELECTED APPLET EVENTS OF A USER INTERACTION SEQUENCE

(75) Inventors: Daniel M. Schumacher, Austin, TX (US); Thomas James Watson, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/373,881

(22) Filed: Aug. 12, 1999

(51) Int. Cl.[7] ................................................. G09G 5/00
(52) U.S. Cl. ........................ 345/704; 345/700; 345/749; 345/762; 345/764
(58) Field of Search .................... 345/704, 700, 345/749, 966, 762, 764; 717/4; 709/201, 318, 310; 434/118

(56) References Cited

U.S. PATENT DOCUMENTS

| | | | | |
|---|---|---|---|---|
| 4,941,829 A | * | 7/1990 | Estes et al. | 434/118 |
| 5,600,780 A | * | 2/1997 | Hiraga et al. | 345/334 |
| 6,018,343 A | * | 1/2000 | Wang et al. | 345/356 |
| 6,052,719 A | * | 4/2000 | Benzanson et al. | 709/220 |
| 6,061,518 A | * | 5/2000 | Hoffman | 717/4 |
| 6,088,712 A | * | 7/2000 | Huang et al. | 707/526 |
| 6,118,940 A | * | 9/2000 | Alexander, III et al. | 717/4 |

\* cited by examiner

Primary Examiner—Kristine Kincaid
Assistant Examiner—Mylinh T Tran
(74) Attorney, Agent, or Firm—Joseph P. Lally; John D. Flynn; Mark E. McBurney (57) ABSTRACT

A method, system, and computer program product for recording events that result from user interaction with the various components of an applet, such as a Java applet. An applet event recorder is invoked and associated with an applet, preferably via a graphical user interface. One or more types of events are then selected for recording via a recording options section of the graphical user interface. When a user interaction sequence with the applet occurs, events of the selected type are then detected by the applet event recorder. An automator of the applet event recorder then generates and stores the queued event objects in an automator queue. The automator then generates, presumably at a later time, constructed events from the queued events in the automator queue. The constructed events are then played back by posting them in the system queue thereby achieving the recording and playback of selected events.

19 Claims, 10 Drawing Sheets

RECORDING SELECTED APPLET EVENTS OF A USER INTERACTION SEQUENCE

RELATED APPLICATIONS

The following U.S. patent applications contain related subject matter: Schumacher and Watson, Recording Selected Events of a User Interaction Sequence; Ser. No. 09/373,881 and Schumacher and Watson, Storing and Manipulating Event Timing in an Applet Playback Module, Ser. No. 09/373,883; and Schumacher and Watson, Recording and Playing Back User Interaction Event Sequences, Ser. No. 09/373,880 all filed on the filing date of this application.

BACKGROUND

1. Field of the Present Invention

The present invention generally relates to the field of computer software and more specifically to a system and method for recording user interface events.

2. History of Related Art

The Java programming language addresses an increasingly important consideration for computer software, namely, platform independence. Platform independence refers to the ability of software to be used on various hardware systems. With a platform independent language, for example, the same source code file can be used to generate object code for two different computer systems (via system specific compilers). Java addresses supports platform independence primarily through the creation of the Java Virtual Machine. The Java Virtual Machine is an abstract computer and its specification defines certain features every Java Virtual Machine must have. However, the specification for the Java Virtual Machine is flexible enabling it to be implemented on a wide variety of computers, devices, and operating systems. One of the main tasks performed by a Java Virtual Machine is to load class files and execute the bytecodes they contain.

One type of program executed by a Java Virtual Machine is an applet. An applet is a Java program that has a set of standard properties which are defined by the Applet class. This class was developed by Sun Microsystems and is included in the standard Java Software Development Kit (Java SDK). Applets inherit the drawing and event handling methods of the AWT Component class. (AWT stands for Abstract Windowing Toolkit; applets and applications use its classes to produce user interfaces). Drawing refers to anything related to representing an applet on-screen—drawing images, presenting user interface components such as buttons, or using graphics primitives. Event handling refers to detecting and processing user input such as mouse clicks and key presses, as well as more abstract events such as saving files and iconifying windows.

Although, a Java program that executes on one platform should execute in the same manner on any Java enabled platform, program or applet should be tested on all platforms. Since user actions in Java are handled by events and since it can sometimes take many hours or days for a problem to manifest itself, testing of the entire Java Virtual Machine on a platform can be very tedious. Therefore it is desirable to provide methods of automating the functional testing of the Java platform on various systems. However, current methods of automating testing of the Java platform on various systems requires a specialized execution environment as well as compilation of a separate program. The JavaStar product from Sun Microsystems, for example, compiles a code segment representative of a user interaction session into a Java script-like program that is executed to recreate the effects of the user interaction session. Products of this type typically consume a significant amount of memory, require training, and slow the testing process with time consuming complications. Therefore, there is a need for a simpler method of testing the Java platform that does not require recompilation of code, that does not require the applet or application to be exited before automation, and that uses fewer system resources.

SUMMARY OF THE INVENTION

The problems identified above are addressed in the present invention by method for recording events that result from user interaction with the various components of an applet, such as a Java applet. An applet event recorder is invoked and associated with an applet, preferably via a graphical user interface. One or more types of events are then selected for recording via a recording options section of the graphical user interface. An automator of the applet event recorder places automator listeners on each component of the applet. When a user interaction sequence with the applet occurs, events of the selected type are then detected by the automator listeners, which generate and store queued event objects in an automator queue. The automator then generates, presumably at a later time, constructed events from the queued events in the automator queue. The constructed events are then played back by posting them in the system queue thereby achieving the recording and playback of selected events.

The invention further contemplates the emulation of a sequence of events in which the storing and retrieval of queued event objects is facilitated through the use of an index to a component vector. When the applet event recorder is invoked and an applet is loaded and initialized, the automator generates a component vector that includes a reference to each component of applet. Events (or a selected portion thereof in embodiments including the ability to identify selected events for recording) are detected by the applet event recorder via automator listeners. The automator listener then generates queued event objects and stores the queued event objects in an automator queue. The generation of queued event objects in this embodiment of the invention includes the generation of a component index value that points to the component in the component vector that was responsible for generating the corresponding user interaction event. When it is later desirable to emulate the recorded portions of the original user interaction sequence, the automator generates constructed objects from the queued event objects. If the emulation of the original sequence occurs when the instance of applet present during the original user interaction sequence is no longer present, the component vector is generated for a second (or more) time. Each time the component vector is generated, the ordering of the components in the component vector is identical. In this manner, the component index field will always point to the correct component in the vector. The constructed objects are then played back to emulate the recorded portion of the original user interaction sequence by posting the constructed objects to system queue where they are dispatched to applet listeners.

The invention further contemplates the ability to record and manipulate delay information associated with the recorded portions of the original user interaction sequence. User interaction events, including timing information associated with each event, are detected by the applet event recorder via automator listeners. The automator listeners then generate queued event objects including delay information computed from the timing information of each event where the delay information indicates the amount of time that elapsed between the posting of consecutive events during the original user interaction sequence. A timing mode is then selected from the mode section of a graphical user interface and an emulated sequence comprising a set of constructed objects produced by automator from the queued event objects is generated. The automator utilizes the delay information in queued event objects and the timing mode selected to produce an emulated sequence with a desired timing sequence.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Figure 1:
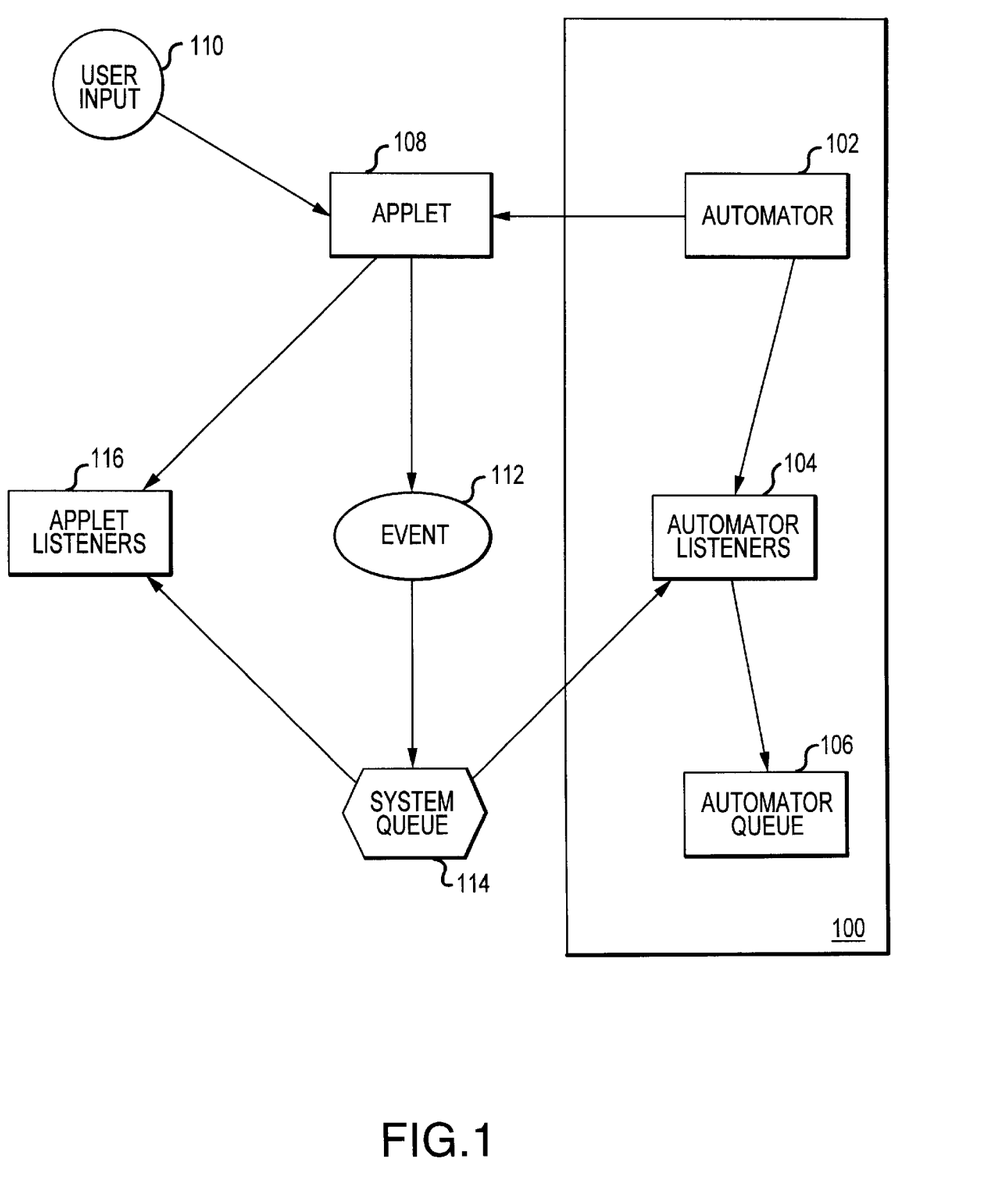
FIG. 1 is block diagram representation of the operation of an applet event recorder in accordance with an embodiment of the invention.

Turning now to the drawings, FIG. 1 presents a simplified block diagram illustrating operation of an applet event recorder 100 according to one embodiment of the invention. As its name suggests, applet event recorder 100 works in conjunction with an applet 108, which is preferably a Java or Java-compliant applet. A Java applet is frequently invoked by opening a hyper-text markup language (HTML) document or page that contains the applet. In many applications, the HTML page containing the applet is accessed by specifying the page's uniform resource locator (URL) with an internet web browser. An applet may also be invoked directly with an appropriate applet viewer. Each applet includes one or more component objects or components (not shown). Each component object of applet 108 provides user interface objects such as buttons, labels, pop-up lists, and scrollbars that invite user interaction when the user invokes the applet. A button component, for example, invites the user to press or "click" the button by way of a conventional computer mouse or suitable pointing device. When a user interacts with a component or an applet, the JVM generates an event object 112 and stores the event object in a system queue 114. System queue 114 then dispatches events to applet listeners 116. Applet listeners 116 are objects that detect the occurrence of specified events and initiate a desired action in response to detecting the event. For example, if a mouse event listener 116 is placed on a button component of applet 108 and the user clicks on the button with the mouse, the mouse event listener will detect the occurrence of the event and will, presumably initiate some action in response to the event. Similarly, a keyboard event listener placed on appropriate components of applet 108 will detect user keyboard entries with respect to those components.

Applet event recorder 100 according to the embodiments described herein provides a mechanism for emulating user interaction with a software system such as a JVM. Recorder 100 greatly simplifies the task of verifying the functionality of a given software platform on a variety of systems and permits the automated re-creation and manipulation of a user interaction sequence thereby greatly facilitating the task of implementing a platform or application on the system. Applet event recorder 100, according to the embodiment depicted in FIG. 1, includes an automator object 102 (also referred to herein simply as automator 102). The applet event recorder 100 with Automator 102, when invoked, provides the user with a graphical user interface for associating an applet 108 that is to be monitored and for selecting user interaction extent types for monitoring. Automator 102 then places automator listener objects 104 on components of applet 108. Each automator listener 104 is adapted to detect a selected type of user input 110. In the preferred embodiment, automator listeners 104 are suitably configured to store detected events to an automator queue 106 as queued event objects. In one embodiment, the types of user events detected by automator listeners 104 may comprise Java AWTEvent objects (where AWT is an acronym for Abstract Windowing Toolkit) or any object derived from the AWT event class, such as Swing events.

Figure 2:
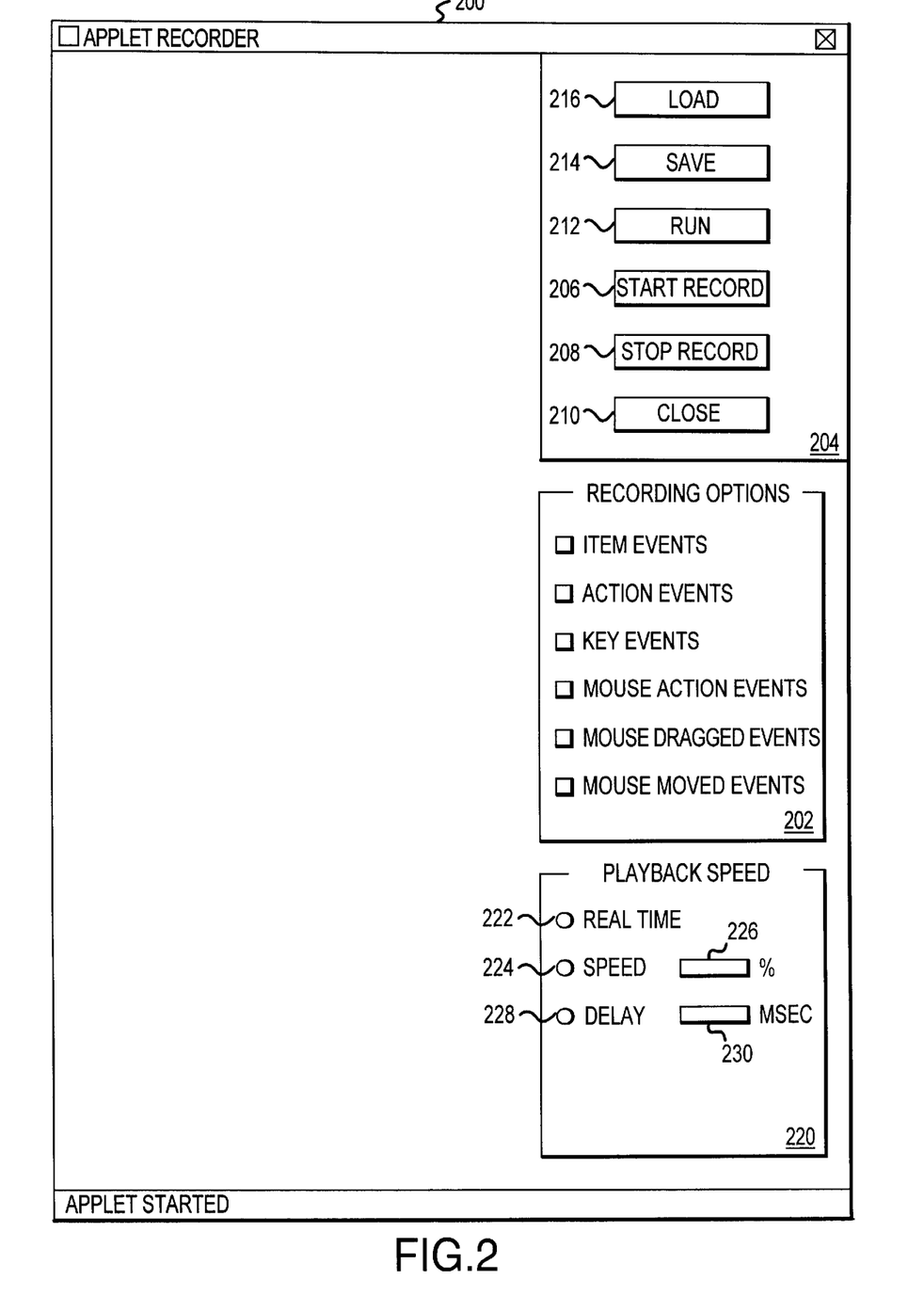
FIG. 2 is a representation of a graphical user interface suitable for invoking the applet event recorder of the present invention.

In one embodiment, automator 102 provides the capability of selecting the type or types of user input 110 via a graphical user interface (an example of which is shown in FIG. 2). If, for example, it is desirable to record only keyboard entries such as by way of AWT KeyEvent object, automator 102 provides a simple and friendly user interface enabling one to select one or more of multiple types of events that may be recorded. When the appropriate selection is made, automator 102 places an automator event listener corresponding to each selected event type on each component of Applet 108. When attaching the automator event listeners 104 to each component of applet 108, a check is done to indicate which listeners are appropriate for that component type (e.g., action events listeners are appropriate for button types, but not for label types). In another embodiment, automator 102 enables a user to place automator listeners 104 on selected components of applet 112. In the preferred embodiment, automator listeners 104 receive events dispatched from system queue 114 and, upon receiving such an event, automator listeners 104 capture the event's information and store the captured information as a stored event object in automator queue 106. The stored event objects in automator queue 106 can be recreated or played back at a later time. Recorder 100 runs in the same execution environment as applet 108 to simplify the task of recording and playing back input sequences. Moreover, applet event recorder 100 is adapted to play the stored event objects in automator queue 106 directly, thereby eliminating the necessity of recompiling the recorded information to generate a test sequence.

Turning to FIG. 2, one embodiment of a graphical user interface (GUI) 200 for use with applet event recorder 100 of FIG. 1 is shown. GUI 200 includes a recording options section 202 in which a list of selectable events type to be recorded is presented. Any one or more of the listed event types can be selected for recording with applet event recorder 100. In the depicted embodiment, the list of event types that may be selected for recording includes item events, action events, key events, mouse action events, mouse dragged events, and mouse moved events. GUI 200 further includes a function section 204 in which the functional modes of GUI 200 are selected. In the preferred embodiment designed to provide a user of applet event recorder 100 with an intuitive interface, the functional modes of applet event recorder 100 identified in section 204 consists of a short list of function buttons including Start Record button 206, Stop Record button 208, Close button 210, Run button 212, Save button 214, and Load button 216. After associating applet event recorder 100 with and applet 108, Start Record button 206 and Stop Record button 208 initiate and terminate respectively the recording of the event types selected in section 202. After a sequence of events has been recorded and the recording function of applet event recorder 100 terminated via Stop Record button 208, the recorded events stored in automator queue 106 may be saved to disk with Save button 214. When a recorded sequence of events is desired for playback at a later time, applet event recorder 100 retrieves the recorded events via Load button 216 and initiates the playback with Run button 212. With the concise interface of GUI 200, applet event recorder 100 provides a lightweight and standalone tool for both recording event sequences in a GUI intensive platform such as Java and playing back the stored sequence at a later time. By storing recorded events in as queued event objects suitable for playback, applet event recorder 100 eliminates any formatting or other compilation step required to transform the recorded events into a sequence suitable for emulating user input.

Figure 9:
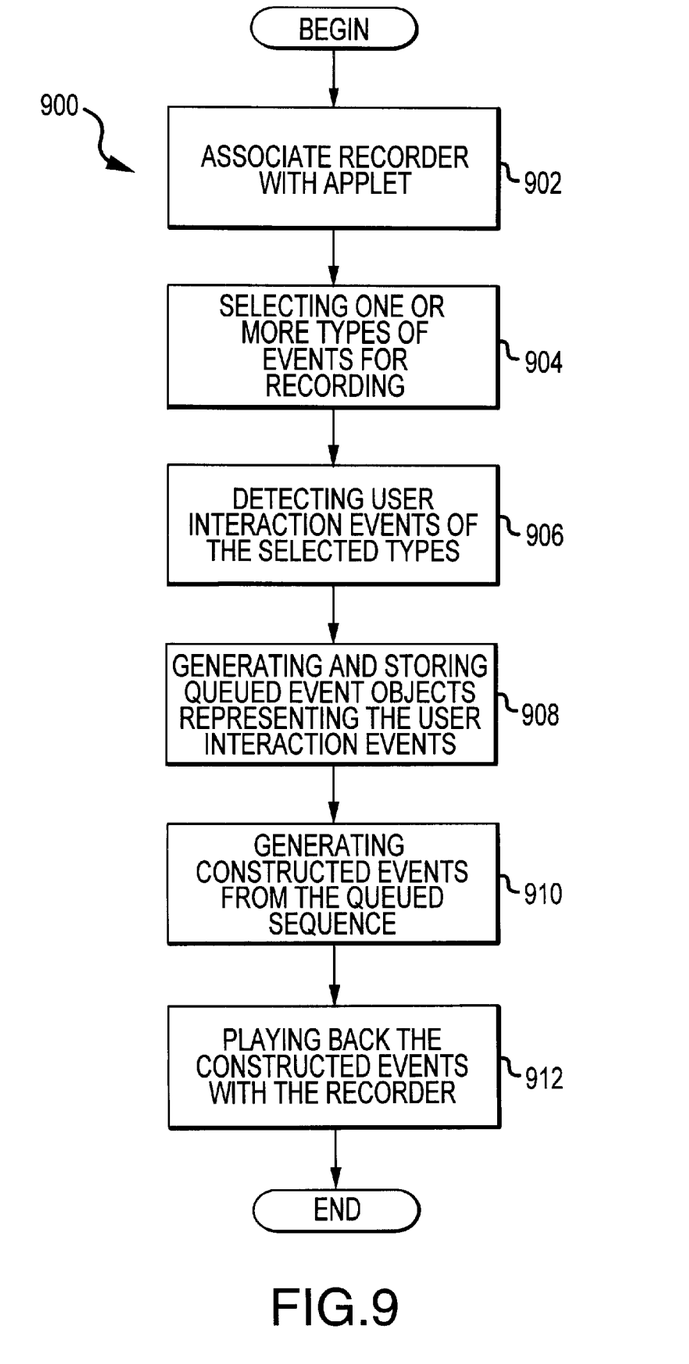
FIG. 9 is a flow diagram of a method for selectively recording user interaction events according to one embodiment of the invention.

Turning to FIG. 9, a flow diagram representative of a method 900 for recording events that result from user interaction with the various components of applet 108. Method 900 encompasses the embodiments of applet event recorder 100 including selective event recording as described previously with respect to FIGS. 1 and 2. When applet event recorder 100 is invoked, it is associated (step 902) with an applet 108 via graphical user interface 200. One or more types of events 112 are then selected (step 904) for recording via recording options section 202 in GUI 200.

When a user interaction sequence with applet 108 occurs, events 112 of the selected type are detected (step 906). Automator listeners 104 of applet event recorder 100 then generate and store (step 908) queued event objects 140 in automator queue 106. When it is later desired to emulate the user interaction sequence, automator 102 generates (step 910) constructed events 150 from queued events 140 in automator queue 106. The constructed events 150 are then played back (step 912) by posting them in system queue 114 as further described below.

Figure 3:
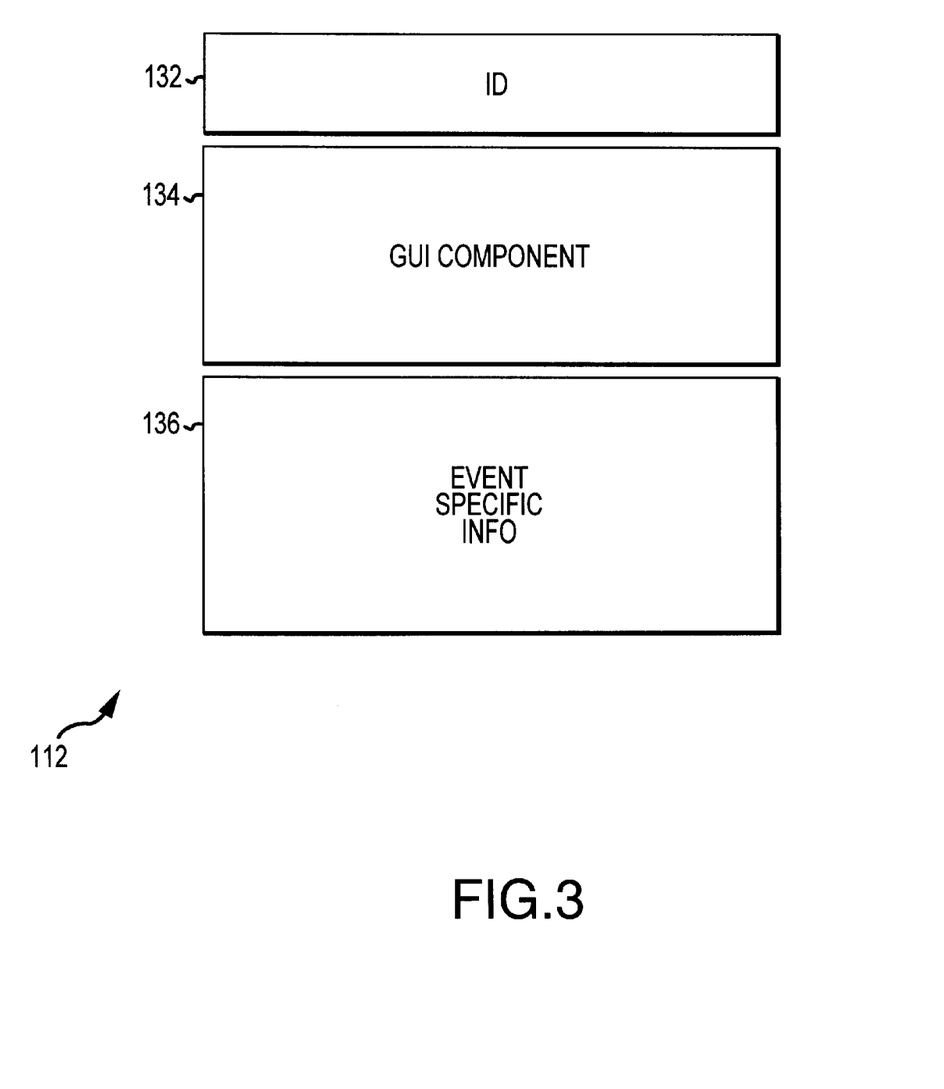
FIG. 3 is a block diagram of an event produced by user interaction with an applet component.
Figure 4:
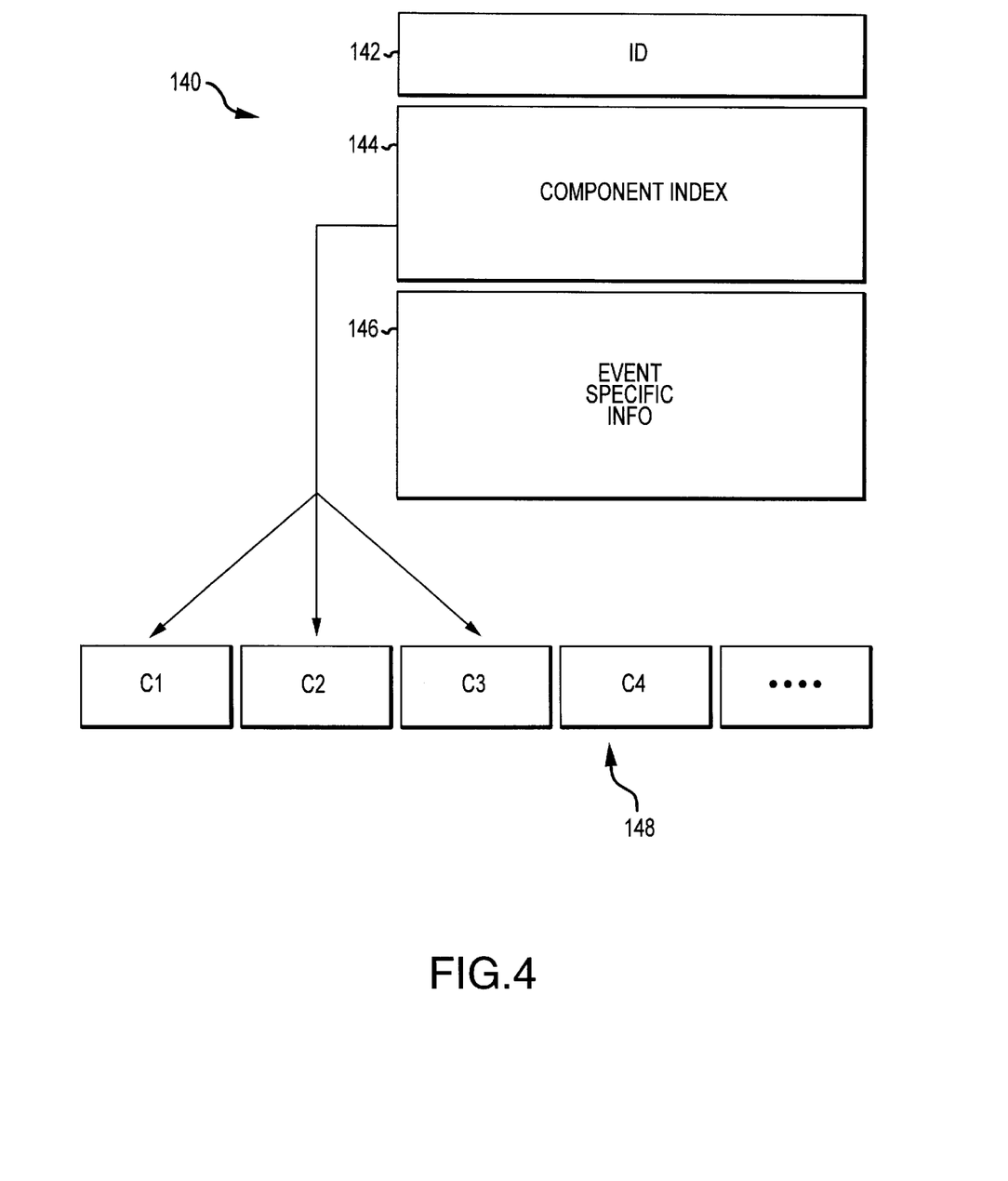
FIG. 4 is a block diagram a queued event object according to an embodiment of the invention.

Turning now to FIGS. 3 and 4, further detail is shown with respect to one embodiment of applet event recorder 100. Before discussing the specifics of this embodiment of the invention, a general discussion of applet operation and queued events is appropriate. Referring momentarily back to FIG. 1, the normal operation of an applet includes the applet 108, applet listeners 116 attached to the components of applet 108, and system queue 114. When a user performs an action on a component of applet 108, an event 112 is constructed and posted to system queue 114. System queue 114 later dispatches event 112 to applet listeners 116 of the component that the action occurred on. When applet event recorder 100 is invoked, automator 102 of applet event recorder 100 attaches automator listeners 104 corresponding to each selected event type to each component of applet 108. When system queue 114 then dispatches an event of interest to applet event recorder 100, automator listeners 104 detect the event and take appropriate action including queuing the event in automator queue 106. In an embodiment in which events 112 are formatted in a Java type format, however, automator 102 performs additional processing to enable playback of the queued events at a later time (i.e., when the applet session that generated the queued event objects in automator queue 106 is over and a new instance of applet 108 is invoked). Referring to FIG. 3, simplified representation of an event 112 is presented. Event 112 includes an ID portion 132, a GUI component portion 134, and event specific information 136. ID portion 132 provides sufficient information to determine the event type of event 112. GUI component portion 134 is a reference to the GUI component on which the event is acting such as a button or a text field. The presence of this GUI component presents an obstacle to serializing and preserving user interactions and the events 112 such interactions produce because it cannot be guaranteed that the instance of the GUI component that was present when the user interaction occurred will be present when the sequence is played back at a later time. If the GUI component referenced in portion 134 of event 112 is no longer present when the recorded events are played back, an error occurs thereby disrupting the testing of applet 108.

Turning now to FIG. 4, a queued event 140 according to one embodiment of the invention is presented. Queued event 140 is queued in automator queue 106 of FIG. 1 when an automator listener 104 detects an event (of the appropriate event type) dispatched from system queue 114. Queued Event 140 includes an ID component 142, a component index field 144 in lieu of the GUI component field 134 of event 112, and event specific information 146. The ID component 144 and event specific information 146 contain essentially the same information as fields 132 and 136 respectively of event 112 although event specific information 146 of queued event 140 may include delay timing information for use with an embodiment of applet event recorder 100 adapted for manipulating the timing of a given sequence as described in greater detail below. Component Index 144, however, instead of containing a reference to an actual GUI component of the applet that may or may not be present, contains a value that is used to index a component vector 148 generated by automator 102. The component vector 148 contains references to each component of applet 108. Automator 102 generates a new component vector 148 and assigns an index value to each component of component vector 148 each time applet 108 is invoked. Automator 102 references the applet components the same order each time a component vector is generated such that an applet component that is referenced in the first component of component vector 148 during a first invocation of applet 108 is referenced in the first component each time thereafter. When the queued events are later used to reconstruct the user interaction sequence, the index value is used to re-create the appropriate event to post to system queue 114.

Figure 5:
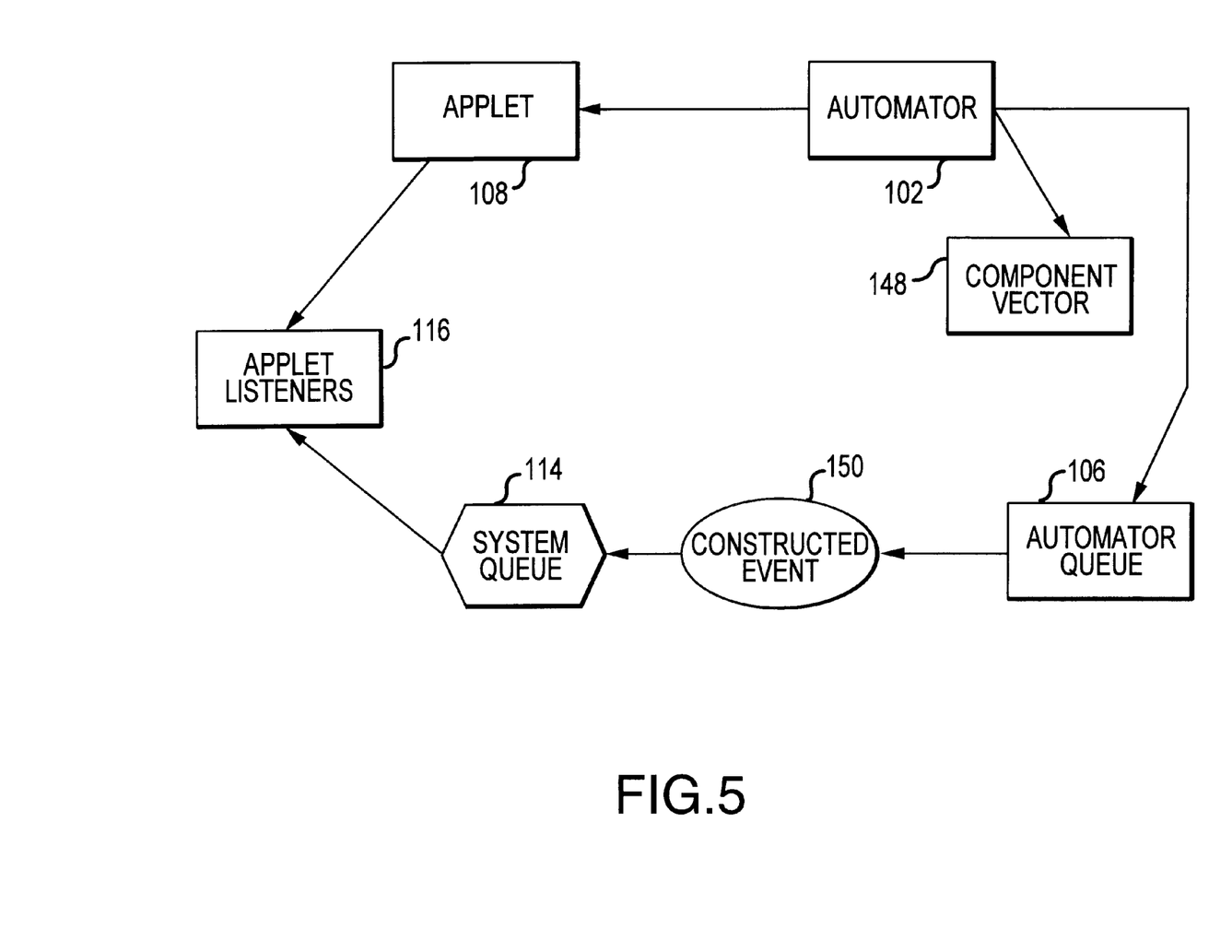
FIG. 5 is a representation of a the construction of an event sequence from queued event objects stored in an automator queue according to one embodiment of the invention.

FIG. 5 depicts the process of playing back queued events with applet event recorder 100 according to one embodiment of the invention. When applet event recorder 100 loads an automator queue 106 from a from a stored file, automator 102 pops the queued events off of automator queue 106 in the same order the events were recorded. Utilizing the component index value 144 stored with each queued event 140 to access the appropriate component of component vector 148, automator 102 constructs a constructed event object 150 (or simply constructed event 150) from each queued event in automator queue 106. Each constructed event 150 corresponds to a user interaction event 112 that resulted in the formation of the queued event 140. Each constructed event 150 is essentially a duplicate of the corresponding user interaction event 112. Automator 102 then posts constructed events 150 to system queue 114, which then dispatches the constructed events to the appropriate applet listeners 116 to be processed in a manner as if an actual user were generating the events. In this manner, the applet event recorder 100 accomplishes playback of queued events during a subsequent applet session without compiling any new code.

Figure 11:
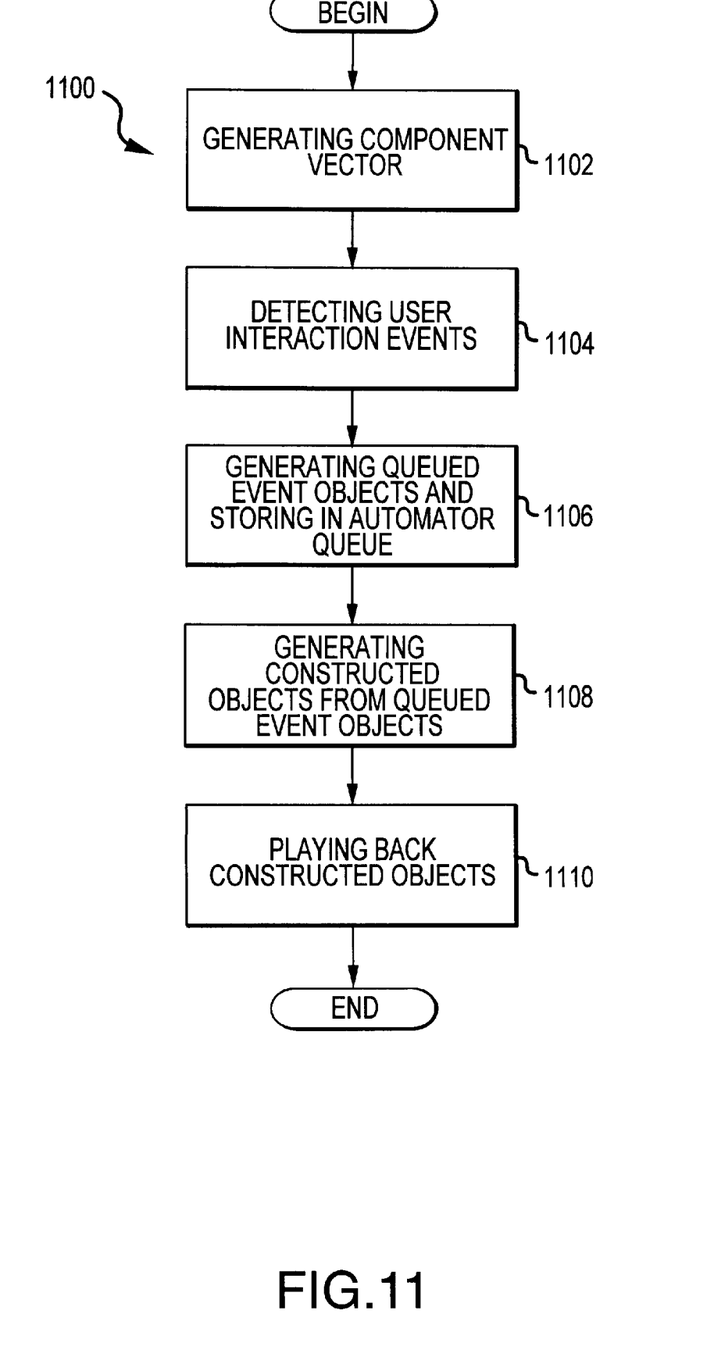
FIG. 11 is a flow diagram according to a method for recording and playing back a user interaction sequence utilizing a component vector according to one embodiment of the invention.

Turning to FIG. 11, a flow diagram of a method 1100 of emulating a sequence of events 112 that result from a user interaction with an applet 108 is presented. Method 1100 emphasizes the storing and retrieval of queued event objects that include an index to a component vector 148 as described in the preceding paragraphs with respect to FIGS. 3, 4, and 5. When applet event recorder 100 is invoked and an applet 108 is loaded and initialized, automator 102 generates (step 1102) component vector 148 including a reference to each component of applet 108. Events 112 (or a selected portion thereof in embodiments including the ability to identify selected events for recording) are detected (step 1104) by applet event recorder 100 via automator listeners 104. Automator listeners 104 then generate (step 1106) queued event objects 140 and store the queued event objects in automator queue 106. The generation of queued event objects in this embodiment of the invention includes the generation of a component index value 144 that points to the component of component vector 148 that was responsible for generating the corresponding user interaction event 112. When it is later desirable to emulate the recorded portions of the original user interaction sequence, automator 102 generates (step 1108) constructed objects 150 from the queued event objects 140. If the emulation of the original sequence occurs, as is most typically the case, at a later time when the instance of applet 108 present during the original user interaction sequence is no longer present, step 1108 includes a process in which component vector 148 is generated for a second (or more) time. Each time the component vector 148 is generated, the ordering of the components of component vector 148 is identical so that the component index field will always point to the same component of applet 108. Constructed objects 150 are then played back (step 1110) to emulate the recorded portion of the original user interaction sequence by posting the constructed objects to system queue 114 where they are dispatched to applet listeners 116.

Figure 6:
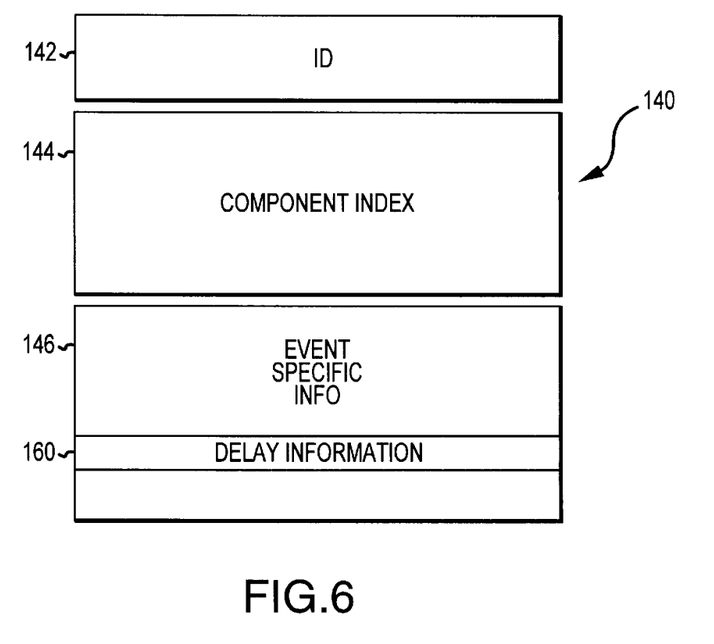
FIG. 6 is a representation of a queued event object including delay information according to one embodiment of the invention.
Figure 7:
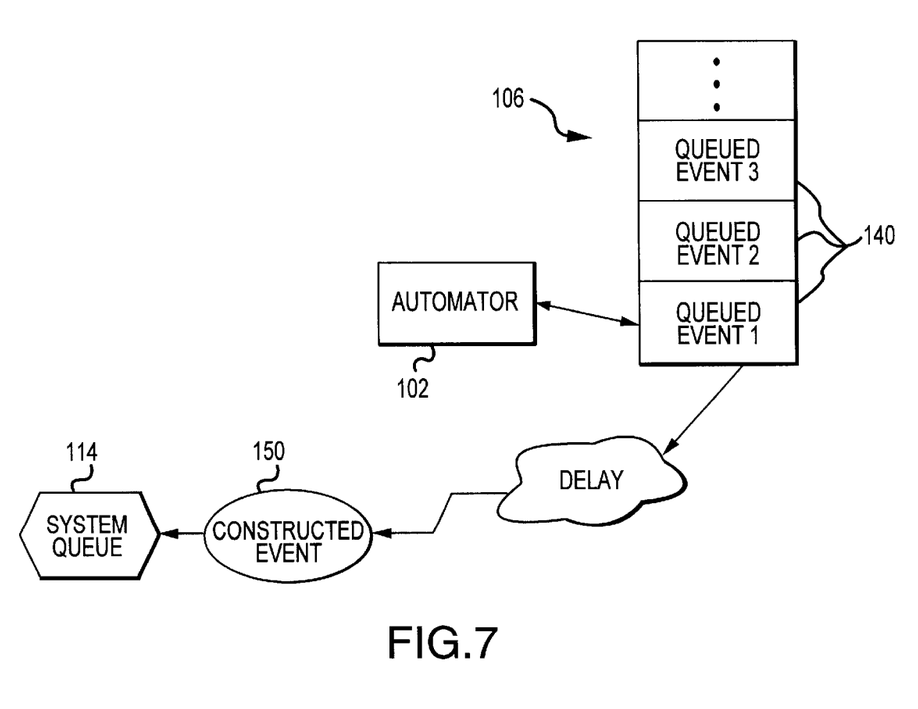
FIG. 7 is a representation of a method for reproducing an event sequence including reproducing and manipulating the timing of the event sequence.

Turning now to FIGS. 6 and 7, operation of an embodiment of the invention emphasizing the storing, manipulating, and utilizing of information related to the timing between user interaction events 112 is depicted. In this embodiment of the invention, automator 102 uses a time stamp in each event 112 to calculate the delay between the dispatching of successive user interaction events 112. In the preferred embodiment, the delay is calculated as the difference between time stamps of successive events. This delay information, represented in FIG. 6 by reference numeral 160, is stored in event specific information component 146 of each queued event 140 while the user interaction sequence is being recorded. By preserving delay information 160 associated with a user interaction sequence, automator queue 106 includes sufficient information to simulate not only the content of a user interaction sequence, but also the timing. The incorporation of a facility to measure, store, and utilize the delay timing of a user interaction sequence as a property of each event 112 in this embodiment of the invention advantageously provides the ability to analyze issues and problems specifically related to sequence timing. FIG. 7 depicts the playback of an automator queue 106 that includes delay information 160 in each queued event 140 of automator queue 106. As in the embodiments discussed previously, queued events 140 are popped off automator queue 106 in the same sequence in which they were recorded. In the embodiment of FIG. 7, however, automator 102 extracts the delay information 160 from each queued event 140 and delays the generation of a corresponding constructed event 150 for dispatch to system queue 114. The amount of time that automator 102 waits until generating a constructed event 150 from a corresponding queued event 140 is a function of the delay information 160. In one case, automator 102 simply delays generation of each constructed event for the amount of time indicated by delay information 160 to produce a real time playback sequence. In other embodiments, however, automator 102 includes facilities for manipulating the manner in which delay information 160 is used.

Returning momentarily to FIG. 2, one embodiment of graphical user interface 200 suitable for use with an embodiment of automator 102 that includes facilities for recording and using delay information 160 is shown. In this embodiment, graphical user interface 200 includes a playback speed section 220. The depicted embodiment of playback speed section 220 includes a button list that enables playback in one of three timing modes. Real time button 222 enables, as its name suggests, playback of a stored sequence with the same timing as the original user sequence. Speed button 224 and its corresponding percentage field 226 allow a user to specify the playback timing as a percentage of the original timing. Any percentage values may be entered in field 226 (e.g., 20%, 100%, 500%, . . . ) thereby enabling testing at greatly relaxed timings when it is desirable to eliminate timing considerations and also enabling testing at significantly faster timings when it is desirable to uncover any functionality considerations related to timing and to check the performance limitations of a given platform. Through delay button 228 and its corresponding field 230, a third playback speed mode is available through user interface 200 as depicted in FIG. 2. When delay button 228 is selected, automator 102 ignores delay information 160 in each queued event 140 and, instead, generates a fixed delay value between issuing each queued entry based on a user specified value entered in delay field 230. The ability to specify a fixed delay value is useful in a variety of testing situations in which it is desirable to eliminate the specific timing of a given stored sequence as the source of one or more problems. By enabling playback in real time, percentage time, and fixed time, the embodiment of automator 102 and graphical interface 200 depicted in FIGS. 2, 6, and 7 provide a flexible method for manipulating the timing of a stored sequence thereby greatly enhancing the testing capabilities of automator 102.

Figure 10:
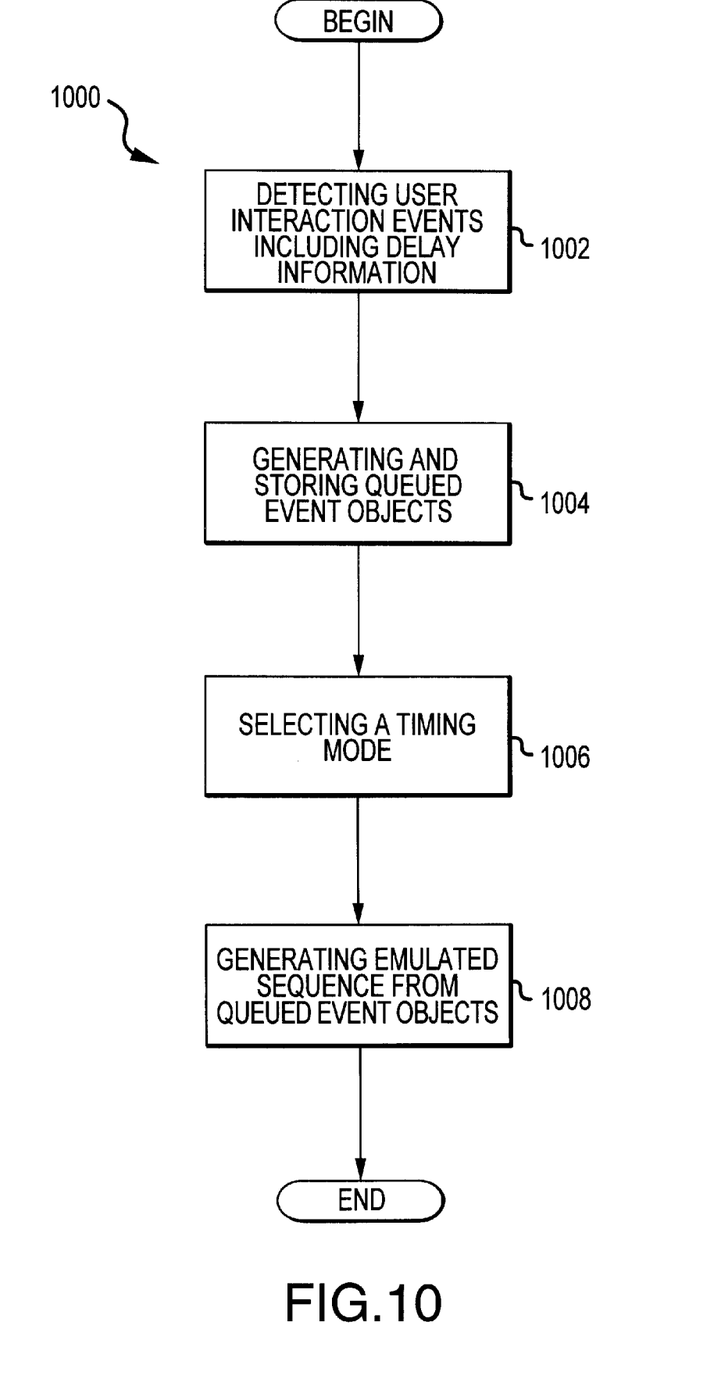
FIG. 10 is a flow diagram of a method for recording and reproducing user interaction event including the timing of the original sequence according to one embodiment of the invention.

Turning to FIG. 10, a flow diagram depicting a method 1000 according to one embodiment of the invention is presented. Method 1000 emphasizes the ability to record and manipulate delay information associated with the recorded portions of the original user interaction sequence as described in the preceding paragraphs with respect to FIGS. 6 and 7. In method 1000, user interaction events 112, including timing information associated with each event 112, are detected (step 1002) by applet event recorder 100 via automator listeners 104. Automator 102 then generates (step 1004) queued event objects 140 including delay information computed from the timing information of each event 112 where the delay information indicates the amount of time that elapsed between the posting of consecutive events 112 during the original user interaction sequence. A timing mode is then selected (step 1006) from the mode section 220 of graphical user interface 200 and an emulated sequence comprising a set of constructed objects 150 produced by automator 102 from queued event objects 140 is generated (step 1008). Automator 102 utilizes the delay information in queued event objects 140 and the timing mode selected to produce an emulated sequence with a desired timing sequence.

Figure 8:
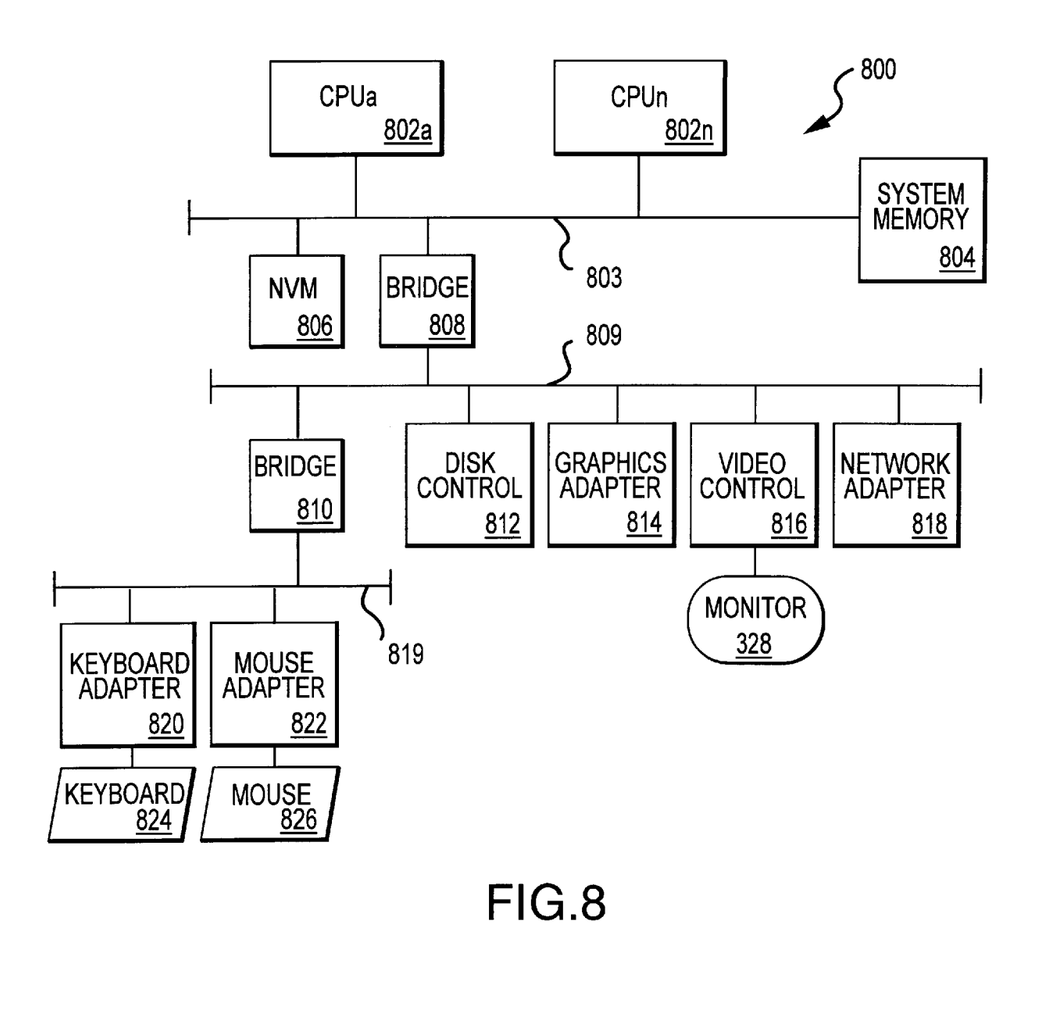
FIG. 8 is a simplified block diagram of a computer system 800 according to one embodiment of the invention.

Turning now to FIG. 8, an embodiment of a computer system 800 suitable for use with the invention is depicted. Computer system 800 includes one or more central processing units 802a . . . 802n (CPUs 802) connected via a system bus 803. A system memory 804 is accessible to CPUs 802 via system bus 803 and provides the primary storage area for active programs and data. In various embodiments, the architecture of CPUs 802 may be compliant with any of a variety of commercially distributed architecture families including the RS/6000 family, the Motorola 68000 family, or the Intel x86 family. CPUs 802 are supported by a non-volatile storage device 806 which is encoded with a boot code sequence suitable for restoring computer system 800 to a functional state after a system reset. In addition, non-volatile storage device 806 may include microcode such as a Basic Input-Output System (BIOS) suitable for providing an interface to the system's I/O facilities including hard disks, floppy disk drives, and compact disc drives. A first bridge 808 provides an interface between system bus 803 and a first I/O peripheral bus 809. First I/O bus 809 is preferably compliant with any of a variety of industry standard bus architectures including the PCI, AGP, MCA, ISA, and EISA architectures. In a presently preferred embodiment suitable for its high speed and the wide of availability of compatible I/O devices, first I/O bus 809 is compliant with the PCI Local Bus Specification Rev 2.2 available from the Internet at www.pcisig.com. In the depicted embodiment, various I/O devices such as disk controller 812, graphics adapter 814, video controller 816, and high speed network adapter 818 are all coupled to first I/O bus 809. While graphics adapter 814 and video controller 816 are indicated as distinct units in FIG. 8, it will be appreciated that video controller 816 may be integrated into graphics adapter 814. Video controller 816 is suitable for refreshing the display monitor 328 with an image storage in a frame buffer (not depicted).

Computer 800, as depicted in the embodiment of FIG. 8, includes a second bridge 810 coupled between first I/O bus 809 and second I/O bus 819. Second I/O bus may provide facilities for devices that are compatible with a different bus architecture than the devices coupled to first I/O bus 819. In one embodiment, second I/O bus 819 is an ISA bus and provides a path between less demanding devices such as a keyboard and a mouse and system bus 803. As depicted, a keyboard adapter 820 and mouse adapter 822 are coupled to second I/O bus 819. The functions supported by these adapters may be integrated into a single device such as a super I/O device that provides facilities for a variety of I/O devices in a single package.

In one implementation, the present invention comprises a set of computer instructions resident in a storage facility of computer 800. The set of instructions, or at least a portion thereof, typically resides in system memory 804 when being executed by CPUs 802 of computer system 800. When not being executed, the set of instructions may reside in a different storage facility including, as examples, a hard disk coupled to disk controller 812, a floppy disk, or a CD. The instructions are suitable for carrying out the method of monitoring the software configuration of system 800 are described previously with respect to FIG. 1 and FIG. 2.

It will be apparent to those skilled in the art having the benefit of this disclosure that the present invention contemplates a lightweight application for recording and playing back a user interaction sequence. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of recording events resulting from user interaction with components of an applet, comprising:

invoking an applet event recorder graphical user interface and associating the applet event recorder with an applet;

selecting, via the graphical user interface, at least one type of event for recording and placing a listener object corresponding to at least one of the selected types on at least one component of the applet;

constructing a component vector that includes a reference to each component of the applet;

detecting with the at least one listener object user interaction events of the at least one selected event type during the user interaction sequence while ignoring user interaction events not of the at least one selected type; and responsive to detecting the user interaction events of the at least one selected type, generating and storing corresponding queued event objects indicative of the detected events in an automator queue of the applet event recorder.

2. The method of claim 1, further comprising generating, via the applet event recorder GUI, constructed events from the queued event objects in the automator queue.

3. The method of claim 2, further comprising playing back the constructed events to emulate at least a portion of the user interaction sequence.

4. The method of claim 1, wherein the placing of listener objects includes placing listener objects corresponding to a particular event type on only those applet components that are appropriate for the particular event type.

5. The method of claim 4, wherein the detecting step comprises the listener object receiving a user interaction event dispatched from a system queue.

6. The method of claim 1, wherein graphical user interface includes a recording option section in which a list of selectable event types is indicated.

7. The method of claim 6, wherein the list of event types selectable for recording is chosen from the group consisting of item events, action events, key events, mouse action events, mouse dragged events, and mouse moved events.

8. The method of claim, 1, wherein each queued event includes an index value that identifies a component in the component vector corresponding to the applet component that generated the user interaction event.

9. The method of claim 8, wherein the step of generating the constructed events includes utilizing the index value in the queued event object to access the component vector to retrieve a component with which the user interacted to generate the user interaction event.

10. A computer system including processor, memory, input, and display, comprising:
   graphical user interface means for associating an applet with an applet event recorder and for selecting at least one type of user interaction event from a list of selectable event types; and
   means for constructing a component vector that includes a reference to each component of the applet;
   listener object means for detecting applet user interaction events of the at least one selected type, generating queued event objects corresponding to each detected event, storing the queued event objects in an automator queue; and
   computer code means for placing the listener object means on at least one component of the applet.

11. The system of claim 10, wherein the means for placing the listener object means includes means for selectively placing the listener object means on only those applet components that are appropriate for the listener object means event type.

12. The system of claim 10, further comprising automator means for generating constructed events from the stored queued event objects and playing back, via the graphical user interface, the constructed events to emulate at least a portion of the user interaction sequence.

13. The system of claim 11, further comprising automator means for generating constructed events from the queued event objects including indexing the component vector with the index value to reference the applet component.

14. The system of claim 10, wherein the list of selectable event types includes item events, action events, key events, mouse action events, mouse dragged events, and mouse moved events.

15. A computer program product for recording user interaction events, comprising a computer readable memory coded with instructions, the instructions comprising:
   graphical user interface means for associating an applet with an applet event recorder and for selecting at least one type of user interaction event from a list of selectable event types; and
   computer code means for constructing a component vector that includes a reference to each component of the applet
   listener object means for detecting applet user interaction events of the at least one selected type, generating queued event objects corresponding to each detected event, and storing the queued event objects in an automator queue; and
   computer code means for placing the listener object means on at least one component of the applet.

16. The computer program product of claim 15, wherein the means for placing the listener object means includes means for selectively placing the listener object means on only those applet components that are appropriate for the listener object means event type.

17. The computer program product of claim 15, further comprising automator means for generating constructed events from the stored queued event objects and playing back, via the graphical user interface, the constructed events to emulate at least a portion of the user interaction sequence.

18. The computer program product of claim 17, further comprising automator means for generating constructed events from the queued event objects including indexing the component vector with the index value to reference the applet component using the indexed component of the component vector.

19. The computer program product of claim 15, wherein the list of selectable event types includes item events, action events, key events, mouse action events, mouse dragged events, and mouse moved events.

* * * * *